Jan. 24, 1961 V. M. EVERETT 2,968,974
METHOD OF MAKING A LAWN RAKE
Filed Sept. 8, 1958 2 Sheets-Sheet 1

INVENTOR.
VERNON M. EVERETT
BY
ATTORNEY

Jan. 24, 1961  V. M. EVERETT  2,968,974
METHOD OF MAKING A LAWN RAKE
Filed Sept. 8, 1958  2 Sheets-Sheet 2
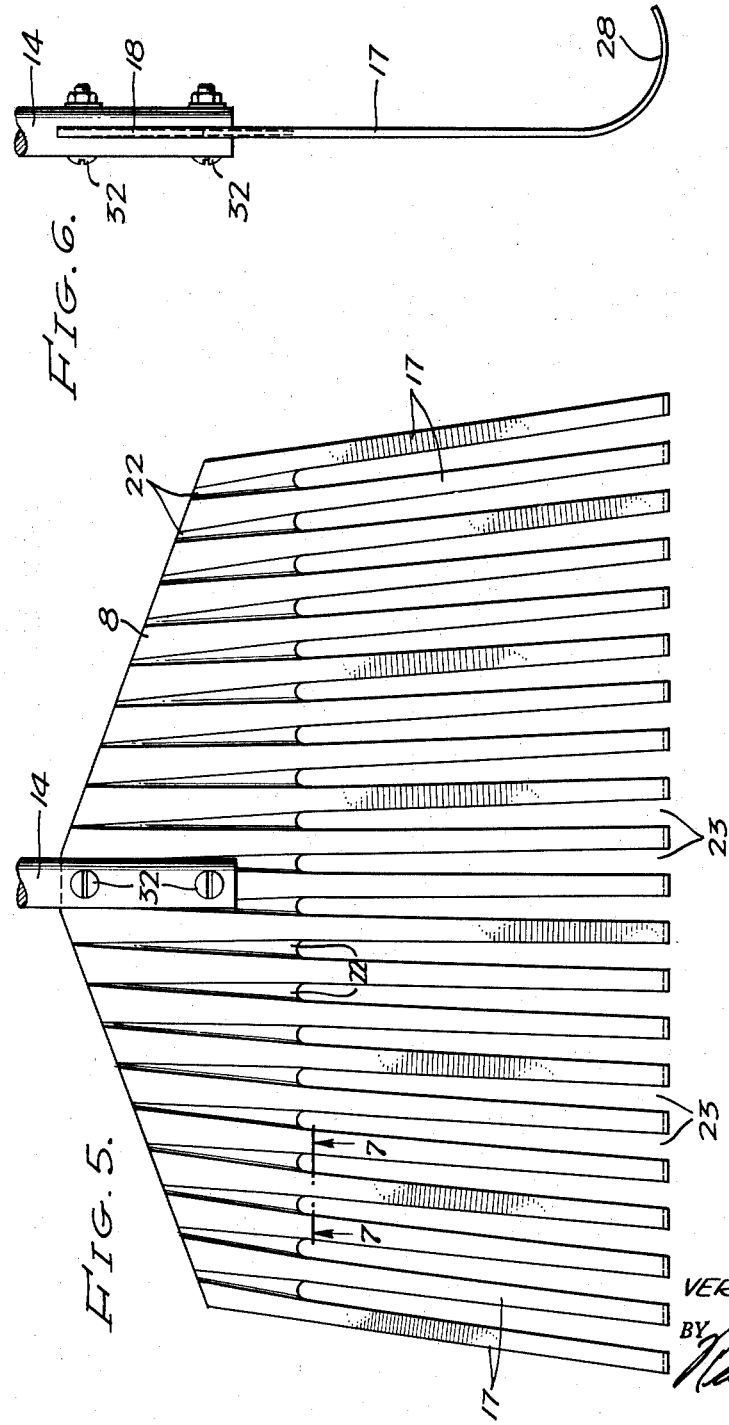
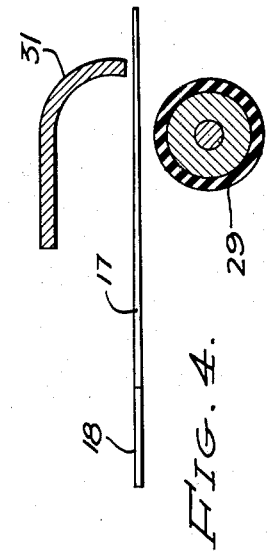
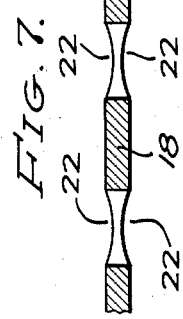
INVENTOR.
VERNON M. EVERETT
BY
ATTORNEY

United States Patent Office 2,968,974
Patented Jan. 24, 1961

2,968,974
METHOD OF MAKING A LAWN RAKE
Vernon M. Everett, 708 N. Harvard, Fullerton, Calif.
Filed Sept. 8, 1958, Ser. No. 759,710
9 Claims. (Cl. 76—111)

This invention relates to a method of making a lawn rake, and to the article formed thereby.

Lawn rakes conventionally fall into two general classes, the first of which comprises rakes having tines or prongs which must be secured to a body or support bar. The second general class comprises those rakes having a unitary or one-piece body with which the tines or prongs are integral. The rakes in the first of the above-indicated classes are generally unsatisfactory because of the expense involved in assembling the tines with the remainder of the rake, and because of the frequency with which the tines become separated during use.

Rakes in the second of the above-indicated classes have been either relatively expensive to manufacture, or characterized by the absence of fanning or divergence of the tines. Thus, if sheet metal blanks for the one-piece rake bodies are formed in such manner as to result in tines which fan or diverge, there is necessarily a very large amount of scrap with consequent high expense in the manufacturing operation. On the other hand, if the blanks for conventional rakes are not adapted to produce divergent tines, the resulting product is generally unsatisfactory since it is widely recognized that fanned tines are desirable for a number of reasons. These reasons include increased area covered by the rake for a given weight of metal, and ease of cleaning leaves and grass caught between the tines.

In view of the above and other factors characteristic of conventional lawn rakes, and methods of manufacturing the same, it is an object of the present invention to provide a method of forming a lawn rake in one piece, except for the handle, in a highly simple and economical manner causing the tines to fan or diverge.

A further object of the invention is to provide a lawn rake having integral tines and body, said tines being divergent and being associated with tapered grooves formed in the body.

A further object is to provide a method of forming a pair of lawn rakes in complementary manner from a single sheet metal blank, and thereafter causing the tines of the rakes to fan or diverge in a desired fashion.

These and other objects and advantages of the invention will be more fully set forth in the following specification and claims, considered in connection with the attached drawings to which they relate.

In the drawings:

Figure 4 is a schematic representation of the final step in the method, in which the ends of the tines are caused to assume a curved configuration;

Figure 5 is a top plan view of the body of the rake, showing the handle connected thereto;

Figure 6 is a side elevation of the rake; and

Figure 7 is an enlarged fragmentary sectional view taken on line 7—7 of Figure 5, showing the tapered grooves which cause the tines to fan or diverge.

Figure 1:
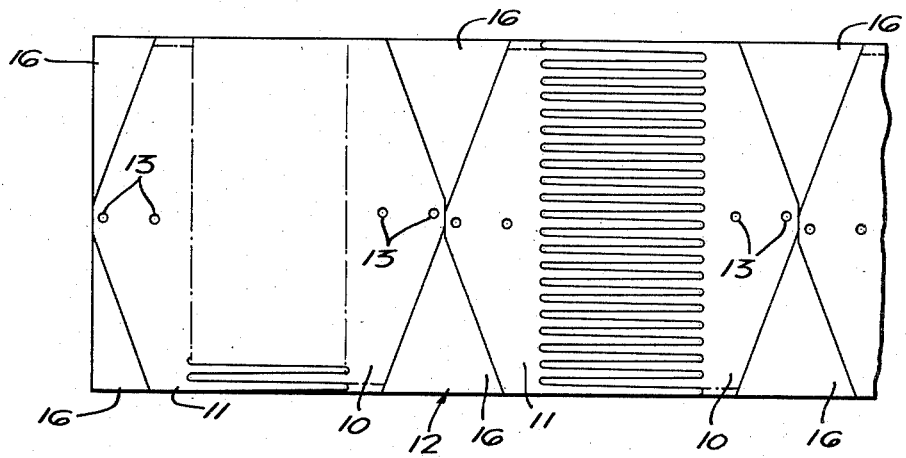
Figure 1 is a plan view illustrating the cutting of the blanks for a number of lawn rakes.

Referring to the drawings, and particularly to Figure 1 thereof, the first step in the method comprises cutting pairs of blanks 10 and 11 out of a strip 12 of sheet metal, in such manner that the tines or prongs of each pair of blanks are complementary. The strip 11 is preferably aluminum having a suitable degree of flexibility and a sufficient thickness to permit the subsequent rolling and groove-forming operations to be described hereinafter. For example, the blank may be 1/16 inch thick. The pairs of blanks 10 and 11 are formed back-to-back, so that the only scrap results from the formation of holes 13 for the handle 14 (Figures 5 and 6), and the generally triangular scrap portions 16 between the beveled or tapered edges of the bodies. It is to be understood that the pairs of blanks need not be cut from strips but may be cut from sheet metal having any suitable configuration.

The blanks 10 and 11 are identical, and only one (number 10) will be described. Such blank has a plurality of parallel tines or prongs 17 which are integral with a body 18 at one edge thereof, the edges of body 18 remote from the tines being beveled as previously indicated. It is to be understood that the tines 17 are necessarily parallel in order to permit the complementary formation illustrated in Figure 1. If the tines 17 were blanked in fan shape, it would be impossible to form complementary blanks 10 and 11, and the amount of scrap would be very greatly increased with consequent increase in the cost of manufacture.

After completion of the blanking operation, the resulting blank 10 is rolled in order to cause the tines 17 to taper in a manner converging away from the body 18. This taper should be relatively uniform, and should cause the extreme ends of the tines to be quite thin (such as 0.033 inch). Since the ends of the tines are thin, they are flexible or resilient so that individual or adjacent tines may be pulled over obstacles without resulting in loss of material being pulled by the rake.

Figure 2:
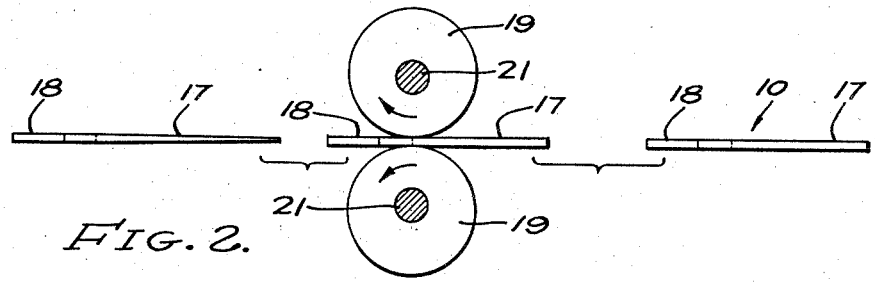
Figure 2 is a schematic elevational view illustrating the rolling of a blank to taper the tines or prongs thereof.

Such rolling operation is shown in Figure 2 as being performed by a pair of rollers 19 mounted eccentrically on shafts 21 disposed on opposite sides of the blank. The rollers 19 are brought to bear against the blank 10 at the line of separation between body 18 and tines 17, so that only the tines are rolled and in a direction away from the body 18. The degree of eccentricity of the rollers 19 is such as to produce the above-indicated uniform taper shown at the left in Figure 2.

Figure 3:
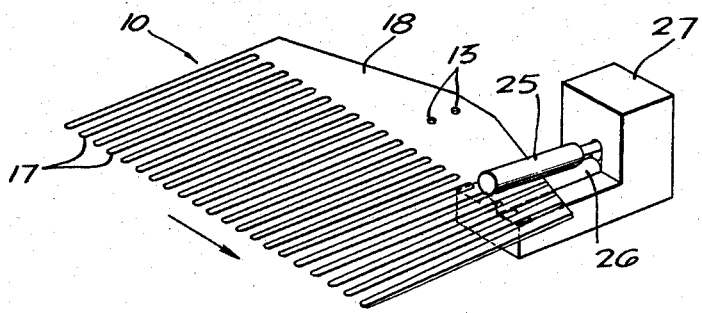
Figure 3 is a schematic representation of the method of causing the tines to fan or diverge.

Referring next to Figures 3, 5 and 7, the next step in the method comprises causing the tines or prongs 17 to fan or diverge in a common plane. This is accomplished by a squeezing operation as shown in Figure 3. A pair of cylindrical teeth or jaws 25—26 are brought to bear against opposite surfaces of the body 18 (which lie in a common plane) and in general alignment with the spaces or gaps 23 between the individual tines 17. The jaws 25—26 bite into the body 18 causing metal to flow (be extruded) from the region occupied by the jaws 25—26. As the jaws or teeth are brought apart, grooves 22 are left in the body 18 as shown in Figure 7. The grooves 22 have their maximum size and depth adjacent the tines 17 and are relatively shallow and narrow remote from the tines, thereby effecting progressive fanning of the tines. Thus, as shown in Figure 5, the tines adjacent the center of body 18 are relatively parallel to each other, whereas the tines remote from the center of body 18 diverge to a considerable extent.

A suitable mechanism 27, which may include large C-clamps, not shown, is provided to move the teeth or jaws 25 and 26 together and apart and thereby extrude the metal and form (bite) the grooves. It is to be understood that when the teeth are in their innermost biting positions they are not parallel to each other but instead are at an angle causing the groove ends adjacent tines 17 to be relatively deep and the groove ends remote thereof to be relatively shallow, as previously indicated.

The grooves 22 should be formed one at a time, in order to permit the fanning effected by each groove-forming operation. Thus, as shown in Figure 3, the blank 10 may be fed between the teeth 25 and 26, and the teeth caused to form the grooves in alignment with the spaces or gaps between the tines. It is emphasized that the teeth should in each instance be kept in line with the spaces or gaps between the tines, and not remain parallel to the edge of the first tine operated upon (the lower tine in Figure 3), in order to eliminate distortion and result in a uniform product.

As the final steps in the method, the outer, relatively thin ends of the tines 17 are bent in a smooth curve to provide the hook portions indicated at 28 in Figure 6. This may be accomplished, as shown in Figure 4, by pressing a resilient cylinder 29 into a correspondingly curved die indicated schematically at 31, thereby causing the ends of the tines to follow the curvature of the internal die surface. The handle 14 is then mounted, by any suitable means such as bolts 32 extended through the holes 13 in body 18.

Various embodiments of the present invention in addition to what has been illustrated and described in detail, may be employed without departing from the scope of the accompanying claims.

I claim:

1. A method of manufacturing a sheet metal rake having integral tines and body, which comprises providing a sheet metal blank having a body portion and a tine portion, said tine portion comprising a plurality of tines integrally connected to said body portion and extending generally parallel to each other, and forming grooves in said body portion generally parallel to said tines to effect fanning apart of the ends of said tines.

2. A method of manufacturing a sheet metal rake, which comprises providing a sheet metal blank having a body and a plurality of generally parallel tines integrally connected to said body, and sequentially forcing a jaw into said body generally parallel to said tines at spaced locations, thereby reducing the thickness of said body where forced by said jaw, said jaw being forced deeper into said body adjacent said tines than remote therefrom whereby said tines are fanned apart.

3. A method of manufacturing a sheet metal lawn rake, which comprises cutting a pair of complementary blanks out of a single piece of sheet metal, said blanks each having a body portion and an integral tine portion which meshes with the tine portion of the other blank whereby substantially no scrap is formed at said tine portions, and squeezing the body portion of each blank to form a plurality of grooves in said body portion generally parallel to said tines, said squeezing step being adapted to cause the groove portions adjacent said tine portion to be of greater magnitude than the groove portions remote therefrom whereby the ends of the tines remote from said body portion are caused to fan or diverge.

4. The invention as claimed in claim 3, in which said squeezing step is performed by sequentially forming individual grooves in a step-by-step operation to permit fanning due to the flow or extrusion of metal from said grooves.

5. The invention as claimed in claim 3, in which said method includes forming each of said grooves in substantial alignment with the gap between each two adjacent tines.

6. A method of forming a sheet metal lawn rake, which comprises cutting a pair of complementary blanks from a single piece of sheet metal, said blanks each having a planar body portion and a plurality of generally parallel tines, said tines of each body portion being meshed with the tines of other body portion to eliminate scrap resulting from the tine blanking operation, and forming a plurality of tapered grooves in each of said body portions in substantial alignment with each gap between each two adjacent tines, said grooves being formed sequentially and by extruding metal to a relatively great extent adjacent said tines and a relatively small extent remote therefrom whereby said tines are caused to fan apart.

7. The invention as claimed in claim 6, in which said method includes the steps of rolling said tines to cause the same to taper away from said body portion, and thereafter shaping the tine ends into hooks.

8. A method of manufacturing a lawn rake from sheet aluminum, which comprises cutting complementary blanks from a single piece of aluminum sheet metal, each of said blanks having a body portion and a substantial number of generally parallel tines integral with said body portion, the tines of each of said body portions meshing with the tines of the other body portion during blanking to thereby substantially eliminate scrap resulting from the tine blanking operation, bringing a pair of generally cylindrical teeth portions into engagement with opposite sides of each body portion in general alignment with the gap between two adjacent teeth of such body portion, biting said teeth together to a greater extent adjacent said tines than remote therefrom whereby metal is extruded to a substantial degree adjacent said tines and to a lesser degree remote therefrom, thereby effecting fanning of said tines, thereafter repeating said tooth-biting operation for the gap between a next adjacent pair of tines and in general alignment therewith to effect further fanning of said tines, and sequentially repeating said tooth-biting operation in alignment with at least a majority of gaps between adjacent tines to effect sequential and progressive fanning of said tines.

9. The invention as claimed in claim 8, in which said method includes taper rolling said tines prior to said tooth-biting operation to cause the ends of said tines remote from said body portion to be relatively thin, and forming said relatively thin ends into hooks.

References Cited in the file of this patent

UNITED STATES PATENTS

| | | |
|---|---|---|
| 1,171,764 | Barden | Feb. 15, 1916 |
| 1,956,263 | Anderson | Apr. 24, 1934 |
| 2,130,828 | Sundqvist | Sept. 20, 1938 |
| 2,237,722 | Wharton | Apr. 8, 1941 |